May 17, 1938.   F. W. FREY   2,117,308
CONNECTER
Filed March 15, 1935
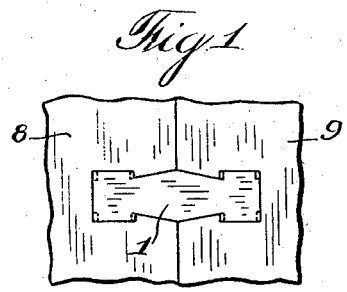
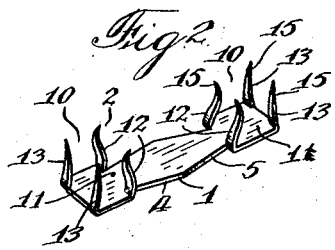
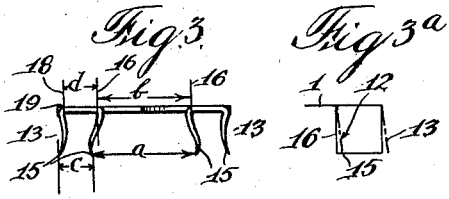
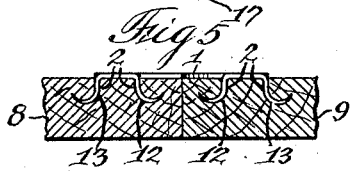
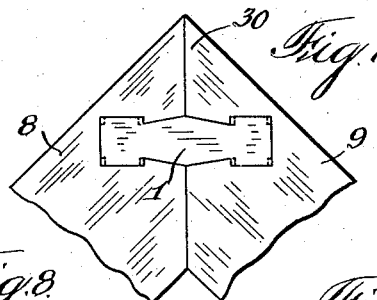
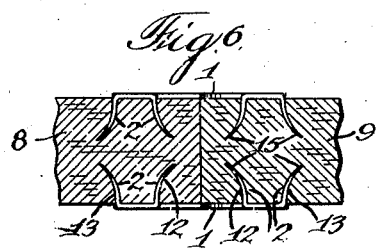
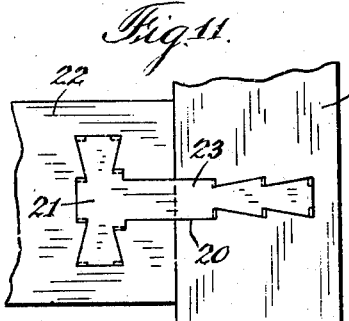
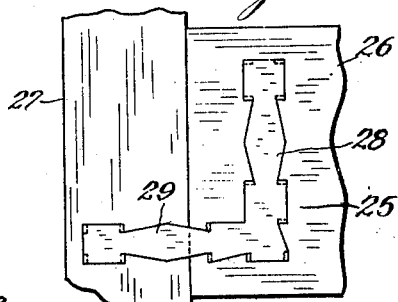
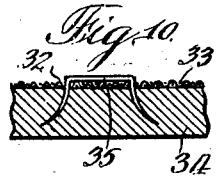
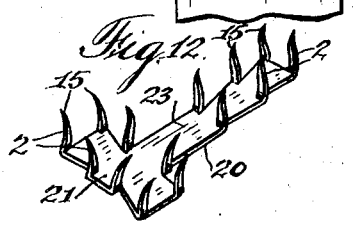
Inventor:
Frank W. Frey
By Jones, Addington, Ames & Seibold
Attys Patented May 17, 1938

2,117,308

UNITED STATES PATENT OFFICE 2,117,308

CONNECTER

Frank W. Frey, Chicago, Ill., assignor, by direct and mesne assignments, to Superior Fastener Corporation, Chicago, Ill., a corporation of Illinois Application March 15, 1935, Serial No. 11,263

11 Claims. (Cl. 85—11)

This invention relates to a connecter, and more particularly to a connecter adapted to fasten or tie together two or more structural members into a rigid unitary construction.

An object of the invention is to provide a connecter adapted for use particularly with penetrable material, such as wood, fiber, composition, etc., capable of entering or of being driven into the material, and so gripping the parts thereof that an exceptionally strong and firm connection is provided which cannot be easily destroyed.

Specifically, an object of the invention is to provide a connecter characterized mainly by a plurality of piercing elements projecting outwardly from the body portion and preferably arranged in groups, the grouping of the piercing elements being arranged in a manner to bring the piercing elements of one group in opposing relation to the piercing elements of another group and also in opposing relation to each other. The connecter may be driven firmly into the material and across the joint to hold the parts securely together.

A still further object of the invention is to provide a connecter of the type described having the piercing elements of each group divergingly penetrating the parts to be connected, that is to say, at an angle to their point of entry, and the piercing elements struck out substantially transversely of the body portion so that the diverging relation of the piercing elements of each group will be in a longitudinal direction and so that the curving of the piercing elements producing such divergence will be outwardly with respect to the plane of the elements. Each element will be caused to bend, therefore, in its curving action, against the thickness only of the material and not against the width of the element. The material being preferably of sheet metal, although it may be of other material, will readily bend against its thickness, and consequently, the curving piercing element penetrating the structural member will enter between the grain without materially cutting or destroying it, such as occurs when the piercing element is forced to curve against its own width. A piercing element forced to curve against its width will tend to cut or destroy the grain instead of compressing it, and will not curve, therefore, as effectively to secure an interlocking action with the grain. I find that bending the piercing element transversely of the body portion of the connecter, and, in the forming operation bending the tip thereof slightly outwardly with respect to the plane of the piercing element, permit the latter to readily curve upwardly and, it might be said, somewhat back upon itself, when penetrating the grain transversely, so as to secure a grip which cannot be destroyed except by a relatively great force.

A still further object of the invention is to provide a connecter of the type described having piercing elements of each group arranged in pairs that divergingly penetrate the material longitudinally of the connecter and so to shape the inner piercing elements of each opposing pair that their tips are spaced farther apart than their corresponding distance at their juncture with the body portion. Consequently, when the outer piercing elements of these opposing pairs penetrate the parts being connected, the connecter is somewhat anchored to these parts to permit the inner prongs to produce a drawing or clinching action, bringing these parts together tightly in a firm and secure joint.

Moreover, it is an object of the invention to space the tips of the piercing elements of each pair, in the forming operation, an equal distance apart with respect to their corresponding distance at their points of juncture with the body portion so that, when driven into place, the piercing elements will not tend to buckle.

Other objects and advantages of the invention will be apparent from the following detailed description taken in connection with the accompanying drawing forming a part hereof.

In the drawing:

Figure 1 is a detailed view of two parts joined by a connecter made in accordance with the invention disclosed herein;

Fig. 2 is a perspective view of the connecter;

Fig. 3 is a side elevation of this connecter;

Fig. 3a diagrammatically illustrates the offsetting of the prongs or piercing elements of each group with respect to the perpendicular to secure a clinching action between certain of the prongs which draw the parts joined tightly together, and, at the same time, an anchoring action by the other prongs for said prongs securing the clinching action;

Figs. 4 and 5 illustrate the manner in which the clinching action of the prongs draws the parts together to produce a tight joint, although these parts may not be tightly held together when the connecter is driven into position. Fig. 5 further illustrates the curling of the prongs where they enter the grain transversely;

Fig. 6 illustrates the curling of the prongs when they are driven into the wood with the grain;

Fig. 7 illustrates how the types of the connecters shown may be used cross-wise of a mitre joint;

Fig. 8 is a perspective view of a modified form of connecter.

Fig. 9 is a side view of this modified form of connecter.

Fig. 10 illustrates this form of connecter for securing two relatively flat members against each other.

Fig. 11 is a view similar to Fig. 1, but illustrating a fastener embodying the invention in a still further variant form.

Fig. 12 is a perspective view of this connecter.

Fig. 13 illustrates another variant form of connecter employed particularly where one of the parts connected is wide and subjected to a relatively great twisting strain, and Fig. 14 is a perspective view of this fastener.

The connecter shown and described herein is adapted for use in a variety of ways and particularly for use in the joining of parts made of penetrable material such as wood, fiber, composition, or the like. The connecter may be provided in different forms depending upon the manner in which it is to be used, and may be driven into place in practically any position with respect to the parts to be connected.

The connecter is preferably made of a metal stamping, the design or shape of which is not fixed but may be varied. As illustrated in Figs. 2 and 3, a series of piercing elements 2 are formed by cutting along the edges of the body portion 1 and by bending the metal outwardly. Certain of the piercing elements 2, such as the inner ones, are cut along lines 4 and 5 and bent outwardly transversely of body portion 1. Although the outer piercing elements 2 are not formed out of the side edges of body portion 1, they are likewise bent outwardly transversely of the body portion. Any number of piercing elements 2 may be provided, but in the embodiment shown in Figs. 1 to 7, inclusive, they are arranged in groups, one group being driven into part 8 and the other group being driven into part 9. Parts 8 and 9 are illustrative of the structural members which may be used to be joined or secured together by the connecter disclosed herein.

It will be noted in Fig. 2 that the connecter is provided at each end with one of the groups of piercing elements. Each end group of piercing elements is then divided into two pairs designated broadly as 10 and 11, each of these pairs comprising an inner piercing element 12 and an outer piercing element 13. In the forming operation, piercing elements 12 and 13 of each end group are struck out from body portion 1 in a manner to cause the inner piercing elements 12 to draw or tend to draw parts 8 and 9 tightly together, as the connecter is driven into place, and to cause the outer prongs 13 to anchor body portion 1 securely to these parts 8 and 9, while inner prongs 12 are performing their drawing or clinching action, this being clearly illustrated in Figs. 4 and 5.

Furthermore, in the drawing operation the tips 15 of these prongs are curved outwardly with respect to the plane of the piercing elements for the purpose of causing the piercing elements to enter or penetrate the parts 8 and 9 at an angle to their point of entry. Although in its broadest aspect the invention is directed to a connecter having piercing elements arranged in end groups which are divided into one or more pairs, each pair having an inner and an outer piercing element, relatively speaking, which enters parts 8 and 9, securing an unusually strong connection and effectively overcoming strains and stresses acting to separate these parts, I find that independently of this feature of grouping the piercing elements, curving the tips outwardly with respect to the plane of the piercing elements, as illustrated at 15, causes these piercing elements to penetrate the parts 8 and 9 in a manner effecting a gripping of the grain or fiber which will more firmly hold them in position. Moreover, arranging the inner and outer prongs 12 and 13, respectively, of each pair so that they will enter the parts 8 and 9 longitudinally of the body portion 1, results in a firmer gripping action by the connecter when it is used to join these parts edgewise of each other, as illustrated in the drawing, as distinguished from an arrangement or grouping of piercing elements of a connecter used merely to fasten one structural part upon another.

To effect the drawing action of inner prongs 12, it is preferable to space their curved tips 15 apart a greater distance than at their point of juncture with body portion 1. To illustrate, distance "a" between the tips 15 is shown in Fig. 3 to be greater than distance "b" between the ends of the prongs at the body portion 1, so that, upon penetration of the material, the curved tips 15 will enter at an angle and tend to curl inwardly toward each other, thereby effectively drawing parts 8 and 9 toward each other. Inasmuch as outer prongs 13 penetrating the material tend to anchor the body portion 1 firmly with respect to the position it ultimately assumes when completely driven into place, inner prongs 12 will tend to force parts 8 and 9 tightly together. I believe at this time that the clinching action obtained by my improved connecter between these parts 8 and 9 is the result of providing a greater space "a" between the curved tips 15 of inner prongs 12 than the distance "b" between the points where they are struck out from body portion 1. To secure this greater distance "a" between curved tips 15 of inner prongs 12, the prongs are bent backwardly to bring these tips 15 to the rear of the perpendicular line 16 projected from the point where these prongs are struck out of body portion 1. The distance that tips 15 of inner prongs 12 extend beyond or in back of perpendicular line 16 will determine the degree of clinching.

Figs. 4 and 5 illustrate the manner in which the connecter will act to draw or clinch parts 8 and 9 together when the connecter is driven into position. In Fig. 4, parts 8 and 9 are slightly spaced, as indicated at 17, when the connecter is initially being driven into position. Figure 5 illustrates how parts 8 and 9 have been clinched together after the connecter has been driven into position.

The extent of curving of the piercing elements 2 will depend upon whether they enter the material transversely of the grain or fiber or with the grain or fiber. Fig. 5 further illustrates the curvature taken by prongs 2 when they enter the material transversely of the fiber or grain, while Fig. 6 illustrates the curvature of the prongs 2, which is somewhat less, when they enter the material with the fiber or grain. In either case, the prongs 2 will curve sufficiently to effect a secure gripping action and will compress the fiber sufficiently to prevent their being accidentally displaced by forces or strains tending to separate parts 8 and 9. The fiber will not be substantially cut or mutilated but compressed. As hereinbefore stated, it is found that arranging the piercing elements 2 in end groups having pairs which enter the material longitudinally of body portion 1 has for its purpose, first, providing inner and outer piercing elements in each pair that oppose each other during penetration and cause the piercing elements to enter or penetrate the material in the most advantageous manner to secure a firm gripping action with the fiber thereof, thereby holding the parts firmly together, and secondly, spacing the curved tips of the inner piercing elements a greater distance apart than the corresponding distance where they join the body portion 1 to effect a drawing or clinching action to bring parts 8 and 9 tightly together at their abutting edges.

It is further desirable to maintain the distance indicated at "c" between the curved tips 15 of inner and outer prongs 12 and 13 of each pair the same as the distance between these same prongs where they are bent outwardly from body portion 1. Accordingly, outer prongs 13 are likewise bent slightly outwardly to bring their tips 15 correspondingly beyond the perpendicular line 18 projected from their point of juncture indicated at 19 in Fig. 3. This will make distance indicated as "c" between the tips 15 of prongs 12 and 13 of each pair equal to the distance indicated as "d" between these prongs at their juncture with body portion 1. With the structure formed in this manner, the connecter may be driven into the parts 8 and 9 without a tendency of either the inner or outer prongs 12 and 13 buckling to prevent their completely penetrating the parts 8 and 9.

The characteristic features of the present invention with respect to the prong formation, as just described, are not limited to any particular arrangement of the prongs in groups. One or more pairs of piercing elements may be provided for each group or one or more groups may be used which has any number of piercing elements.

In Figs. 11 and 12, I have shown a connecter 20 somewhat T-shaped with a leg 21 engaging the cross part 22 and a leg 23 engaging the part 24. Parts 22 and 24 are adapted to be connected together, as described in connection with parts 8 and 9. The number of piercing elements 2 will effectively increase the gripping action and add sufficient strength to offset any particular stress or strain tending to displace the parts 22 and 24.

In Figs. 13 and 14, I have shown a connecter 25 adapted for use where the cross member 26 to be connected to part 27 is unusually wide. To illustrate, part 26 may be a cross member in the construction of a screen door or window. In such a case, there is a decided tendency for cross part 26 to twist. Connecter 25 is designed effectively to overcome such twisting of the part 26. Leg 28 of connecter 25 is provided with a series of say 11 piercing elements 2, while leg 29 is provided with a series of say 4 piercing elements 2. The piercing elements at each end of legs 28 and 29 are arranged in groups of two pairs each. The next three piercing elements of leg 28 of connecter 25 are preferably arranged to penetrate part 26 in the direction of the other four piercing elements forming the group at the end of this leg 28. The remaining four piercing elements of leg 28 may be arranged in pairs with respect to each other, or individually, but as a whole provide a rather substantial gripping action and cooperate with the four piercing elements of the group at the end of this leg 28 in a transverse direction to obtain an exceptionally firm grip with the part 26. The gripping action of leg 28 extends over a rather wide area which would be lateral with respect to leg 29, and is adapted to overcome any twisting action of part 26.

By referring to Fig. 7 it will be noted that line 30, representing the connecting line between parts 8 and 9, may be the line of a mitre joint between these parts where they are arranged to form a corner of a frame or other object to be held together by my improved connecter. The manner in which my improved connecter may be used will depend largely upon the use to which it is put. This connecter has a wide application for securing together structural parts into a rigid unitary construction.

There has been illustrated in Fig. 6 connecters on opposite sides of the parts to be connected together, say the parts 8 and 9 shown in Fig. 1. It will be understood, nevertheless, that it is intended that these connecters may be used on one side only, as is clearly illustrated in Fig. 5.

In Figs. 8 to 10, inclusive, I have illustrated a variant embodiment wherein the connecter 32 is provided with a single group of piercing elements 2, preferably arranged in two pairs, the elements of each pair penetrating the part to be connected in a diverging relation in respect to each other. It is found that this connecter 32 may be advantageously employed where it is desirable to fasten say a fabric 33 against a flat back 34. The flat body portion 35 of the connecter affords sufficient gripping area to prevent the fabric 33 from readily tearing loose, yet providing a firm gripping action which holds the fabric securely in position.

I wish it to be understood that the invention is not to be limited to the particular structure shown for accomplishing the drawing or clinching action. Inasmuch as I believe that I am the first to devise a practical connecter accomplishing this result, I shall claim this feature of the invention broadly. Moreover, I do not wish to be limited to the exact arrangement of the grouping of piercing elements shown herein but intend that the invention shall be directed to an arrangement accomplishing substantially the same purpose.

Without further elaboration, the foregoing will so fully explain the gist of my invention that others may, by applying current knowledge, readily adopt the same for use under varying conditions of service, without eliminating certain features, which may properly be said to constitute the essential items of novelty involved, which items are intended to be defined and secured to me by the following claims.

I claim:

1. A connecter comprising a sheet metal stamping having a substantially flat body portion and a plurality of prongs bent substantially perpendicular on lines transverse of said body portion, said prongs being arranged in pairs longitudinally of said body portion so that each pair enters one of two parts adapted to be connected together thereby edge-wise of each other, said body portion bridging said parts when connected together, the contour of said prongs being adapted to spread the prongs of each pair apart in opposite directions with respect to each other and simultaneously draw said parts together when driven therein.

2. A connecter comprising a body portion and a series of piercing elements grouped at opposite ends of said body portion, said piercing elements being bent substantially perpendicular to said body portion and having their tips curved outwardly from their plane to cause penetration at an angle in a direction longitudinally of said body portion, certain of said piercing elements in each group being adapted to oppose each other in angular direction of penetration and having their tips spaced apart a distance equal to their spaced distance at said body portion.

3. A connecter adapted to secure a number of parts together edgewise of each other comprising a metal stamping having a body portion and a series of piercing elements bent outwardly from said body portion, said piercing elements being arranged in groups of at least one pair at each end of said body portion adapted to penetrate each part, the piercing elements of each pair having bearing surfaces so inclined as to cause penetration in a diverging relation with respect to each other in a direction longitudinally of said body portion and to cause said groups to oppose each other during penetration in a manner to draw said parts together.

4. A connecter adapted to secure a number of parts together edge-wise of each other comprising a body portion and a series of piercing elements, there being a group of at least two piercing elements at each end of said body portion formed transversely thereof to cause penetration in a direction longitudinally of said body portion, each of said parts to be connected adapted to be engaged by two of the piercing elements at each end of said body portion, one of the piercing elements at each end of said body portion being formed with respect to a corresponding piercing element at the opposite end to effect a drawing action tending to bring said parts together, the other remaining piercing elements at each end of said body portion acting to anchor said body portion to said parts during said drawing action.

5. A connecter adapted to secure a number of parts together edge-wise of each other comprising a body portion and a series of piercing elements, there being at least two piercing elements at each end of said body portion formed transversely thereof to cause penetration in a direction longitudinally of said body portion, each of the parts to be connected adapted to be engaged by two of the piercing elements at each end of said body portion, the tips of the said two piercing elements at each end of said body portion being curved outwardly from the plane of said elements in a direction longitudinally of said body portion and in opposite directions with respect to each other, the inner piercing elements of each end two being constructed and arranged to effect a drawing action tending to bring said parts together, the outer piercing elements of each end two acting to anchor said body portion to said parts during said drawing action and without materially opposing said drawing action.

6. A connecter adapted to secure a number of parts together edgewise of each other comprising a body portion and a series of piercing elements, there being at least two piercing elements at each end of said body portion formed transversely thereof to cause penetration in a direction longitudinally of said body portion, each part to be connected adapted to be engaged by two of the piercing elements at each end of said body portion, the tips of the said two piercing elements at each end of said body portion being curved outwardly from the plane of said elements in a direction longitudinally of said body portion and in opposite directions with respect to each other, the inner piercing elements at each end of said body portion being spaced apart at their tips a distance greater than their distance at said body portion to effect a drawing action tending to bring said parts together, the outer piercing elements of each end two acting to anchor said body portion to said parts during said drawing action without materially opposing said drawing action.

7. A connecter adapted to secure a number of parts together edge-wise of each other comprising a body portion and a series of piercing elements, there being at least two piercing elements at each end of said body portion formed transversely thereof to cause penetration in a direction longitudinally of said body portion, each part to be connected adapted to be engaged by two of the piercing elements at each end of said body portion, the tips of the said two piercing elements at each end of said body portion being curved outwardly from the plane of said elements in a direction longitudinally of said body portion and in opposite directions with respect to each other, the inner piercing elements at each end of said body portion being spaced apart at their tips a distance greater than their distance at said body portion to effect a drawing action tending to bring said parts together, the outer piercing elements of each end two acting to anchor said body portion to said parts during said drawing action, said outer piercing elements being spaced apart at their tips a distance substantially equal to the distance between these elements at said body portion.

8. A connecter comprising a body portion and a plurality of piercing elements, said piercing elements being arranged in pairs, the tips of each pair being slightly curved outwardly from the plane of said elements and in diverging relation with respect to each other, the curved tips of each pair being spaced apart a distance substantially equal to their distance apart at said body portion, the elements of each pair thereby being curved inwardly intermediate their length to effect a compressing action of the fiber upon penetration of said elements at an angle in the direction of the curvature of their tips.

9. A connecter comprising a body portion and a pair of piercing elements bent substantially perpendicular to said body portion, said piercing elements being curved inwardly intermediate their ends whereby to turn their tips outwardly in diverging relation with respect to each other and to maintain their distance apart at said tips substantially equal to their spaced distance at said body portion.

10. A connecter comprising a body portion and a pair of transversely formed piercing elements at each end of said body portion arranged to have an effective penetration substantially longitudinally of said body portion, the piercing elements of each pair being constructed and arranged to cause an opposed gripping action with respect to each other and with respect to the gripping action of the opposite pair.

11. A connecter of sheet metal adapted to secure a number of parts together edgewise of each other comprising a body portion and at least two piercing elements at each end of said body portion formed transversely of said body portion to cause penetration in a direction longitudinally of said body portion, each part to be connected adapted to be engaged by said two of the piercing elements at each end of said body portion, the tips of said two piercing elements at each end of said body portion being curved outwardly from the plane of said piercing elements in a direction longitudinally of said body portion, the tips of corresponding piercing elements at opposite ends of said body portion being spaced apart a distance greater than their distance at said body portion.

FRANK W. FREY.